United States Patent [19]

Bassfeld

[11] Patent Number: 5,762,835
[45] Date of Patent: Jun. 9, 1998

[54] AERATOR

[75] Inventor: Hans-Joachim Bassfeld, Wesel, Germany

[73] Assignee: Envicon Klartechnik Verwaltungs-Gesellschaft mbH, Dinslaken, Germany

[21] Appl. No.: 756,652

[22] Filed: Nov. 26, 1996

[30] Foreign Application Priority Data

Dec. 1, 1995 [DE] Germany ................ 295 18 898.7

[51] Int. Cl.$^6$ ........................................ B01F 3/04
[52] U.S. Cl. ........................ 261/122.1; 261/122.2
[58] Field of Search ......................... 261/122.2, 122.1

[56] References Cited

U.S. PATENT DOCUMENTS

| | | | |
|---|---|---|---|
| 3,970,731 | 7/1976 | Oksman | 261/122.1 |
| 4,288,394 | 9/1981 | Ewing et al. | 261/122.1 |
| 4,569,805 | 2/1986 | Hume et al. | 261/122.1 |
| 4,849,749 | 7/1989 | Schneider | 261/122.2 |
| 5,000,884 | 3/1991 | Bassfeld | 261/122.2 |
| 5,422,043 | 6/1995 | Burris | 261/122.1 |

FOREIGN PATENT DOCUMENTS 6751014  1/1969  Germany ............. 261/122.1

*Primary Examiner*—Tim R. Miles
*Attorney, Agent, or Firm*—John F. A. Earley; John F. A. Earley, III; Harding, Earley, Follmer & Frailey

[57] ABSTRACT

Aerator with a basic body (10) that can be connected to an air feed (50) pipe and with a diaphragm (20), which can be attached to the basic body (10) and whose edge (20r) can be fixed to the circumferentail surface (10r) of the basic body (10) by a static fastening part (30) for the diaphragm (20), which fastening part is designed such that it surrounds the edge (20r) of the diaphragm (20) in a positive-locking manner and can be fixed itself to the basic body (10) wherein the basic body (10) has, on its side facing a way from the said diaphragm (20), a centrally arranged air inlet area (12, 14), on which the fastening part (30) can be placed with a corresponding connection part (36).

11 Claims, 1 Drawing Sheet

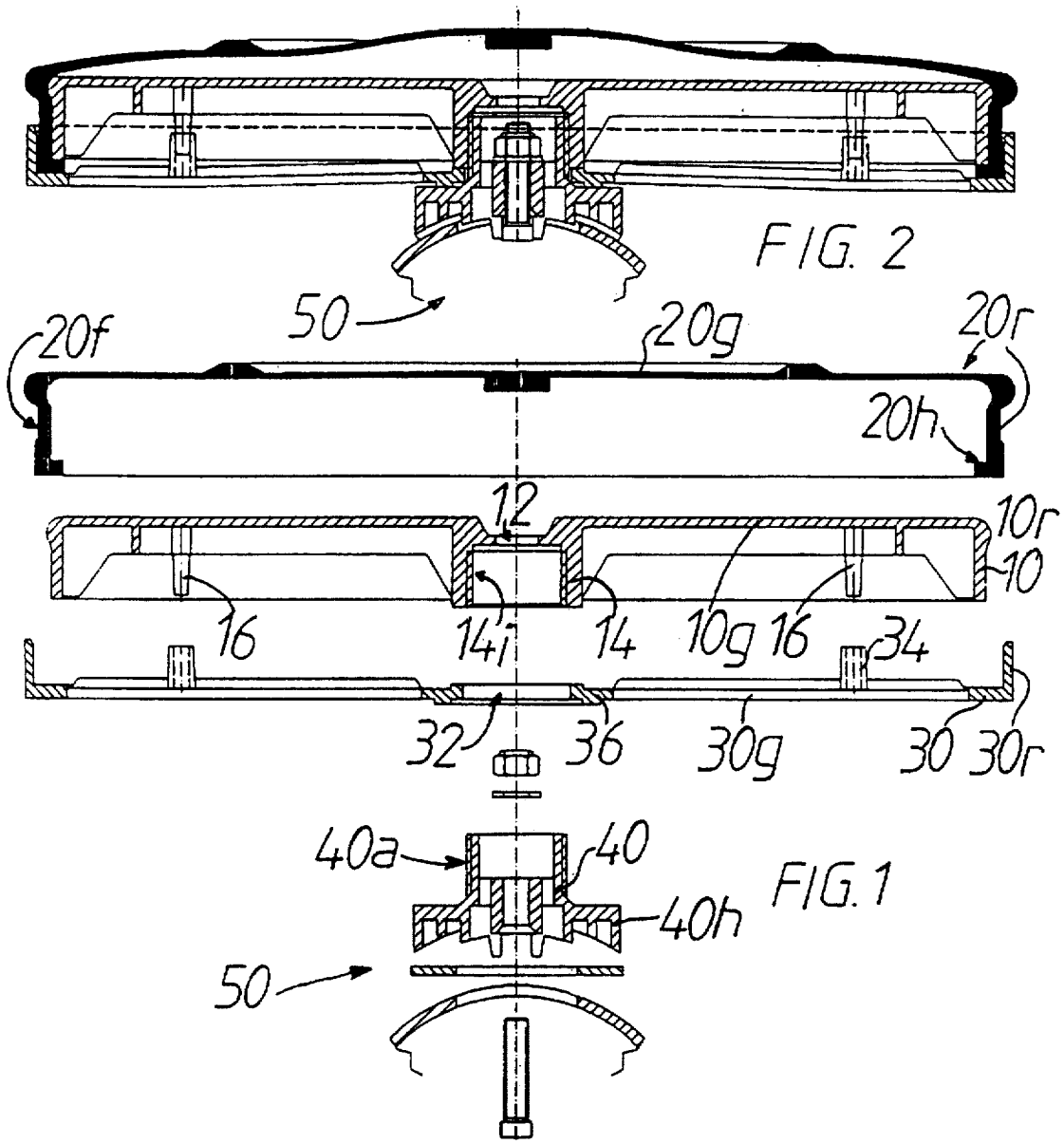

1

AERATOR

SPECIFICATION

The present invention pertains to an aerator with a basic body that can be connected to an air feed and with a diaphragm, which can be attached to the basic body and whose edge can be fixed to the circumferential surface of the basic body.

Such an aerator is used to inject a gas into a liquid, especially into a wastewater to be treated. Such aerating elements are used, among other things, for the fresh-keeping aeration of wastewater, for introducing air/oxygen into aeration tanks or fixed-bed units and for stabilizing sludge, for aerating rivers, lakes and fish ponds, but also for neutralizing liquids by treating them with carbon dioxide gas.

Such aerating elements have been known essentially in two embodiments: As tubular aerators and as so-called surface or disk aerators. The present invention pertains to the latter group.

Such an aerator has been known from EP 0 363 865 B1. The fastening of the diaphragm on the basic body represents a certain problem, because air is injected under high pressure between the basic body and the diaphragm. To reliably fix the diaphragm to the basic body, the diaphragm is pulled over the circumferential surface of the basic body on the edge side in the prior-art embodiment and is fixed there to the basic body by means of a clamp-type strap. Such a clamp-type strap is usually made of steel, while the basic body is typically made of a plastic.

Such an aerator cannot be used in corrosive wastewaters, which have, e.g., a high chloride content, because the steel strap is corroded and there is a risk that the diaphragm will subsequently become detached. Moreover, if the said clamp-type strap is used, which is tensioned, e.g., by means of a screwdriver, there is a risk that the strap will not come to lie exactly flat on the edge of the diaphragm and cuts into the diaphragm during tensioning.

Thus, the basic object of the present invention is to make possible the reliable fixation of the diaphragm in an aerator of this class and preferably also to avoid corrosion problems.

Based on an aerator of the type mentioned in the introduction, the present invention is based on the discovery that the object can also be accomplished by means of a static fastening part for the diaphragm, wherein the fastening part is designed such that it surrounds the edge of the diaphragm in a positive-locking manner and can be fixed itself to the basic body.

Contrary to a clamp-type strap, the fastening part provided according to the present invention is consequently a static part, which itself does not need to be tensioned. To ensure the fixation of the diaphragm, the fastening part has such a shape for this purpose that it can be pushed directly onto the outer surface of the edge of the diaphragm; a small gap may be present if necessary to prevent the diaphragm from becoming detached. To prevent the fastening part itself from becoming detached, it is fixed to the basic body.

The fastening part is consequently pushed simply onto the basic body or the edge of the diaphragm and is fastened to the basic body. Numerous embodiments, some of which will be described in greater detail below, are available for fastening to the person skilled in the art.

The fastening part can be attached to and/or screwed onto the basic body. The screwing may be performed directly or indirectly. It is advantageous to fasten the fastening part to the basic body with a separate screw especially when the fastening part lies directly on the outer surface of the edge of the diaphragm in order to avoid a relative movement between the fastening part and the edge of the diaphragm, especially because such a relative movement is difficult especially if the diaphragm is made of a rubber or natural rubber, i.e., if it has a relatively high surface roughness.

The fastening part may be fixed to the basic body, e.g., in the area of the air feed, as it is also described in the following description of the figures.

According to one embodiment of the present invention, the circumferential surface of the basic body, the edge of the diaphragm and the section of the fastening part surrounding the edge of the diaphragm extend in parallel to one another in the assembled position. Aerators of this class usually have a round basic shape if they are disk aerators. Consequently, the circumferential surface of the basic body, the edge of the diaphragm and the section of the fastening part surrounding the edge of the diaphragm extend concentrically to one another in the assembled position in this case.

It is not absolutely necessary for the fastening section of the fastening part to be endlessly circular, even though such an embodiment is preferred.

If the basic body has a centrally arranged air inlet area on its side facing the diaphragm, the fastening part can be attached and/or screwed on there with a corresponding connection part. The fastening part is, of course, designed in this case such that there are connections, which may be designed in a spoke-like pattern (i.e., extending radially), between the said connection part and the fastening section.

According to another embodiment, the air inlet area of the basic body and the connection part of the fastening part are aligned flush with one another in the assembled position and can be fixed against each other with a separate connection part. The air inlet area and the connection part may now be provided with internal threads each, which can be connected to one another by means of a connecting sleeve having external threads.

The following procedure is then followed during assembly: The diaphragm is first placed on the edge side around the circumferential surface of the basic body. If the edge of the diaphragm has an undercut on the inside, this undercut is placed under the edge of the circumferential surface of the basic body, as a result of which additional safety is obtained against detachment of the diaphragm. The fastening part is then pushed onto the edge of the diaphragm until the connection part comes to lie on the air inlet area of the basic part. The said connecting sleeve or an equivalent connection part is then screwed on in a last operation in order to connect the basic body and the fastening part to one another.

According to one embodiment, the basic body and the fastening part are dimensioned such that the fastening part is fixed with pretension to the basic body in the assembled position, as it also appears from the following description of the figures.

In such an embodiment, there could be a risk in an extreme case that the fastening part is displaced relative to the basic body, if, e.g., the connective sleeve becomes detached. To rule out such a relative movement, additional plug-in means can be provided between the basic body and the fastening part. These are, e.g., pins, which project from the underside of the basic body and are introduced into corresponding openings in the fastening part when the basic body and the fastening part are being brought together. A single such pin would be sufficient, in principle; however, e.g., two pins or openings offset by 180° relative to one another are provided for safety reasons.

Like the basic body, the said fastening part may also be made of plastic. If a rubber or natural rubber or an elastomeric synthetic material is used for the diaphragm, all components of the aerator are free from corrosion, as a result of which the life of the device as a whole is increased.

In addition, plastic parts can be manufactured with ease, e.g., according to the injection molding process. Moreover, they are inexpensive.

One special advantage of the aerator described is the fact that no tools or the like are needed for the assembly.

Additional features of the present invention will become apparent from the features of the subclaims as well as the other application documents.

BRIEF DESCRIPTION OF THE DRAWINGS

The present invention will be described in greater detail below on the basis of an embodiment. In schematic representations, FIG. 1 shows an exploded view of an aerator according to the present invention, and FIG. 2 shows the aerator according to FIG. 1 in the assembled state.

DETAILED DESCRIPTION

The aerator according to FIG. 1 comprises a basic body 10, a diaphragm 20, a fastening part 30, and a connecting screw 40.

The basic body 10, the diaphragm 20, and the fastening part 30 have a round basic shape.

The basic body 10 has a central opening 12, which is limited at the edge by a tubular socket 14, which has internal threads 14i. This area is used to feed in air, as will be described in greater detail below.

Two pins 16 project from the base 10g of the basic body 10 (in the downward direction in the figure), and the edge is also bent downwardly (in the downward direction in the figure).

The diaphragm 20, whose base 20g has a plurality of perforations, is designed corresponding to this. The beaded edge 20r (beaded in the downward direction in the figure) has an undercut 20h in the inward direction at the free end, and this undercut comes under the free end of the edge area 10r of the basic body 10 in the assembled position (FIG. 2), as a result of which a preliminary fixation of the diaphragm 20 to the basic body 10 is obtained.

The base 30g of the fastening part 30 is somewhat larger than the base 10g of the basic body 10. The edge area extends upwardly (in the figure), and the distance between the edges 30r (or the corresponding internal diameter of the fastening part 30) is selected to be such that after being pushed onto the basic body 10 or the diaphragm 20, the fastening part 30 lies with the edge area 30r directly on the outer surface 20f of the edge area 20r of the diaphragm 20 (FIG. 2), and thus it secures the diaphragm in the manner of an abutment.

The fastening part 30 has a central opening 32, whose edge area is aligned with the socket 14 in the assembled position (FIG. 2).

In the assembled position, the pins 16 of the basic body 10 engage corresponding sleeves 34, which are arranged on the inside of the fastening part 30, in order to secure the basic body 10 from rotating in relation to the fastening part 30.

The connecting screw 40 is finally introduced into the openings 32, 12 for the final assembly, and it is fixed with its external threads 40a in relation to the internal threads 14i of the basic body 10, and the edge area 36 around the opening 32 of the fastening part 30 is pressed in the end position against the socket 14, as a result of which the fastening part 30 as a whole is pretensioned to a certain extent in relation to the basic body 10, as is shown in FIG. 2.

While the basic body 10 and the fastening part 30 are made of plastic, the diaphragm 20 is a rubber diaphragm.

The aerator thus preassembled is then connected to an air feed 50, which is shown schematically in FIGS. 1 and 2, and it has, e.g., the geometry shown in FIG. 2 in the state of aeration.

I claim:

1. Aerator with a basic body (10) that can be connected to an air feed (50) pipe and with a diaphragm (20), which can be attached to the basic body (10) and whose edge (20r) can be fixed to the circumferential surface (10r) of the basic body (10) by a static fastening part (30) for the diaphragm (20), which fastening part is designed such that it surrounds the edge (20r) of the diaphragm (20) in a positive-locking manner and can be fixed itself to the basic body (10) wherein the basic body (10) has, on its side facing away from the diaphragm (20), a centrally arranged air inlet area (12, 14), on which the fastening part (30) can be placed with a corresponding connection part (36).

2. Aerator in accordance with claim 1, in which the fastening part (30) can be attached to the basic body (10) by engagement of pins (16) projecting from a base of the basic body (10) with corresponding sleeves (34) arranged on the inside of the fastening part (30).

3. Aerator in accordance with claim 1, in which the circumferential surface (10r) of the basic body (10), the edge (20r) of the diaphragm (20), and the section (30r) of the fastening part (30) surrounding the edge (20r) of the diaphragm (20) extend in parallel to one another in the assembled position.

4. Aerator in accordance with claim 3, in which the circumferential surface (10r) of the basic body (10), the edge (20r) of the diaphragm (20), and the section (30r) of the fastening part (30) surrounding the edge (20r) of the diaphragm (20) extend concentrically to one another.

5. Aerator in accordance with claim 1, in which the air inlet area (12, 14) of the basic body (10) and the connection part (36) of the fastening part (30) are aligned with one another in the assembled position and can be fixed in relation to one another with a separate connection part (40). .

6. Aerator in accordance with claim 5, in which the air inlet area (14) and/or the connection part (36) are provided with an internal thread (14i) and can be connected to one another by means of a connecting sleeve (40) or the like having external threads (40a).

7. Aerator in accordance with claim 6, in which the connecting sleeve (40) or the like has, on the circumference, a flange-like handling edge (40h) at its freely projecting end.

8. Aerator in accordance with claim 1, in which the dimensioning of the basic body (10) and of the fastening part (30) are selected to be such that the fastening part (30) is fixed to the basic body (10) under pretension in the assembled position.

9. Aerator in accordance with claim 1, in which the basic body (10) and/or the fastening part (30) are made of plastic.

10. Aerator in accordance with claim 1, in which the diaphragm (20) is made of rubber, natural rubber or an elastomeric synthetic material.

11. Aerator in accordance with claim 1, in which the fastening part (30) can be attached to and/or screwed onto the basic body (10), in which the fastening part (30) can be fixed to the basic body (10) in the area of the air feed (50), in which the circumferential surface (10r) of the basic body (10), the edge (20r) of the diaphragm (20), and the section (30r) of the fastening part (30) surrounding the edge (20r) of the diaphragm (20) extend in parallel to one another in the assembled position, in which the circumferential surface (10r) of the basic body (10), the edge (20r) of the diaphragm (20), and the section (30r) of the fastening part (30) surrounding the edge (20r) of the diaphragm (20) extend concentrically to one another, in which the basic body (10) has, on its side facing away from the diaphragm (20), a centrally arranged air inlet area (12, 14), on which the fastening part (30) can be placed, attached and/or screwed with a corresponding connection part (36), in which the air inlet area (12, 14) of the basic body (10) and the connection part (36) of the fastening part (30) are aligned with one another in the assembled position and can be fixed in relation to one another with a separate connection part (40), in which the air inlet area (14) and/or the connection part (36) are provided with an internal thread (14i) and can be connected to one another by means of a connecting sleeve (40) or the like having external threads (40a), in which the connecting sleeve (40) or the like has, on the circumference, a flange-like handling edge (40h) at its freely projecting end, in which the dimensioning of the basic body (10) and of the fastening part (30) are selected to be such that the fastening part (30) is fixed to the basic body (10) under pretension in the assembled position, in which the basic body (10) and/or the said fastening part (30) are made of plastic, and in which the diaphragm (20) is made of rubber, natural rubber or an elastomeric synthetic material.

* * * * *